United States Patent
Kleene et al.

[11] 3,730,369
[45] May 1, 1973

[54] THRUST IMPARTING JOINT CONNECTION

[75] Inventors: Derek K. Keene; Edward W. Miller, both of Philadelphia, Pa.

[73] Assignee: Eaton Corporation, Cleveland, Ohio

[22] Filed: May 7, 1971

[21] Appl. No.: 141,321

[52] U.S. Cl. ................................214/674, 287/12
[51] Int. Cl. ..................................................B66f 9/08
[58] Field of Search.....................92/117, 118, 161; 287/88, 87, 12, 14, 21; 214/672, 673, 674

[56] References Cited

UNITED STATES PATENTS

| | | | |
|---|---|---|---|
| 3,515,301 | 6/1970 | Emke | 214/672 |
| 3,034,810 | 5/1962 | Primeau | 287/21 |
| 3,401,390 | 9/1968 | Braccini | 287/12 |
| 2,923,426 | 2/1960 | Brandt | 214/672 |

FOREIGN PATENTS OR APPLICATIONS 1,015,975   1/1966   Great Britain........................214/674

Primary Examiner—Charles J. Myhre
Assistant Examiner—R. H. Lazarus
Attorney—Teagno & Toddy

[57] ABSTRACT

The joint connection through which a piston rod of a hydraulic ram imparts thrust to a movable part of an industrial truck, such as a pivoting mast, is formed through assembly about the thrust end of the piston rod, of a plate welded or otherwise fixed to the mast, and traversed by the piston rod, a pair of washers having each a flat surface whereby to slide on the plate, and an opposed spherical surface, together with a pair of cones having tapered surfaces applied to the said spherical surfaces. These cones are also mounted on the piston rod, and means are provided for holding the cones and washers assembled relatively to the rod and the plate in an adjusted position on the length of the rod. The washers slide relatively to the plate and pivot relatively to the cones for contributing universal movement between the piston of the cylinder and the plate fixed to the mast.

4 Claims, 5 Drawing Figures

INVENTORS
DEREK K. KEENE
BY EDWARD W. MILLER
ATTORNEY.

INVENTORS
DEREK R. KEENE
BY EDWARD W. MILLER
Tergner & Todby
ATTORNEY.

THRUST IMPARTING JOINT CONNECTION

BACKGROUND OF THE INVENTION

1. Field of the Invention

This invention relates to a thrust imparting connection of that particular type used between the end of the piston rod of a ram cylinder, and a member to be moved by the piston, whereby thrust may be applied by the piston rod to the member to be moved, while permitting the rod and member to move relatively to one another. The contribution of the invention is, in effect, an improvement of the standard universal joint involving a ball and socket.

2. Description of the Prior Art

There are naturally many forms of universal joint connections that may be used between a hydraulic ram or equivalent device and a part to be moved in a pivotal manner by the ram. However, these are generally, so far as is known, not formed for adjustment to facilitate use of one ram in a large number of different installations. Because industrial trucks are basically machine tools adapted for performing a particular operation, there is considerable need for numerous variations of design. Thus, it is common to mount a mast on a fork truck in a number of different positions, and to contribute various types of tilting movement to the mast. It is also necessary to use various lengths of hydraulic rams, particularly positioned in order to accommodate varying constructions. As a result of all this, it is not uncommon for a large manufacturer of industrial trucks to have one hundred or more variations and designs of hydraulic rams adapted to tilt a mast. The same problem may arise in the design of other hydraulic rams for tilting and pivoting other mechanisms in an industrial truck.

As already suggested, so far as is known, there is no contribution to the art of means to decrease the variations in rams or similar devices, through use of an effective thrust imparting connection. The invention to be disclosed in this application does contribute a construction that is well adapted to decrease the need for multiple ram designs, as will appear clearly hereinafter, and yet is simple and effective and not costly to manufacture.

SUMMARY OF THE INVENTION

A feature of this invention resides in the concept of a thrust imparting joint, that while contributing the same type of action as a ball and socket joint, is formed of simple parts that are adapted for installation in numerous different positions and angles, as may be required in the art. A feature of the invention resides particularly in utilizing as part of the joint connection between a ram and a part such as a mast to be moved thereby, of a simple plate fixed as by welding to the mast. As a more particular feature of the invention, a part of the ram such as the end of the ram piston rod, extends through an opening in the plate, with parts at each side of the plate mounted on the ram piston rod and adapted to move with the piston rod to impart motion to the plate in opposed directions. As a further particular feature of the invention, the parts that are applied against the plate are adapted to slide thereon, while pivoting relatively to other parts secured on the ram piston rod.

As a further feature of the invention, the series of parts mounted about the ram piston rod are adapted to be secured thereto at various positions along the length of the rod, and thereby to be adjusted relatively to the mast or other part to which thrust is to be imparted.

It can therefore be said that a general object of this invention is to provide means to be secured in an adjustable position along the length of a ram piston rod or the equivalent thereof for imparting thrust. It must be emphasized that the invention may be used on any thrust imparting device that may take the form of a rod or shaft or the equivalent thereof.

A further particular object of the invention may be said to reside in the provision of means secured relatively to a ram piston rod or the like and adapted for sliding and pivotal adjustment relatively to a fixed part adapted to receive thrust from the piston. In the particular installation to be described in this application this fixed part is a plate or the like welded to a mast.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof may be best understood by reference to the following description taken in connection with the accompanying drawings, in which:

DESCRIPTION OF THE PREFERRED EMBODIMENT

Figure 1:
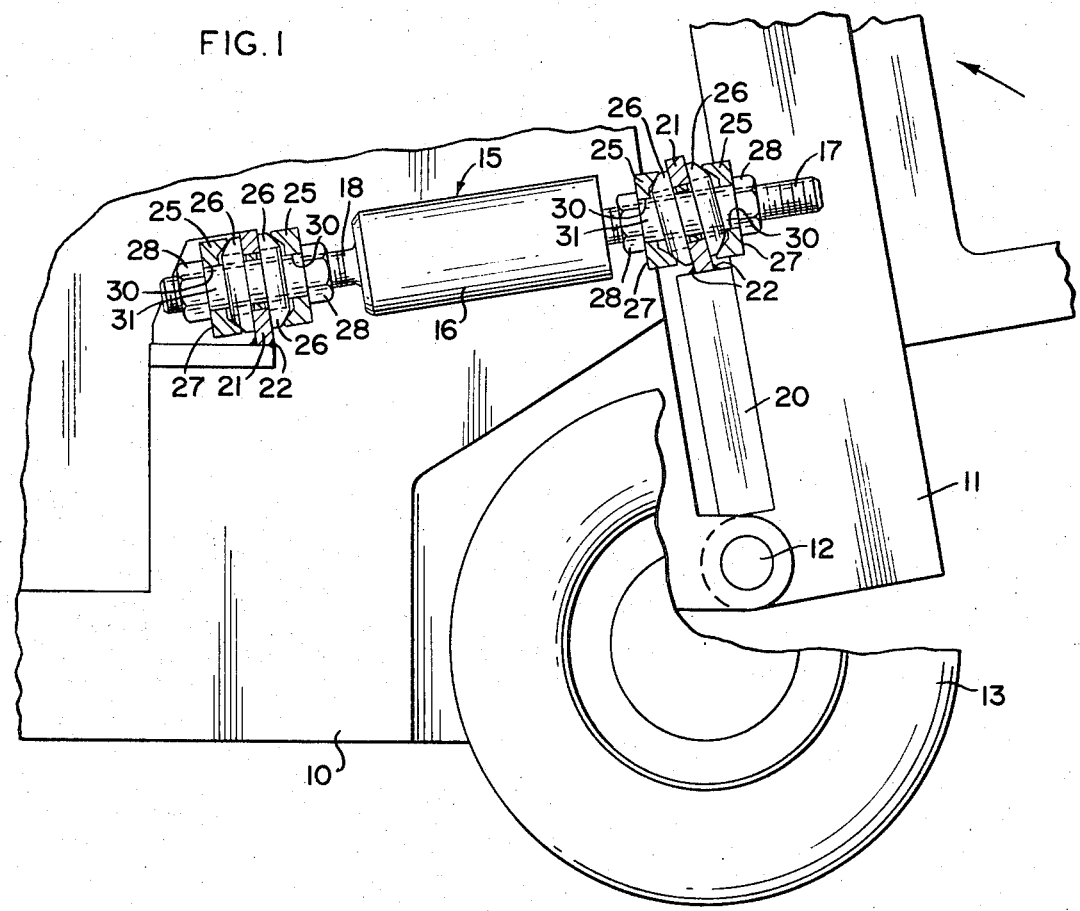
FIG. 1 is a view in elevation showing part of an industrial truck with a mast pivoted thereto and connected to one end of a ram piston rod through the means forming the invention of this application. The end of the ram opposite that end connected to the mast is mounted through similar means relatively to the main frame of the truck.

Referring now more particularly to FIG. 1, reference numeral 10 indicates the main frame of an industrial truck while numeral 11 indicates a standard type of mast. This mast is pivoted at 12 relatively to the main frame, and forwardly of the axis of traction wheel 13, it being understood that there is a traction wheel at each side of the track.

Figure 2:
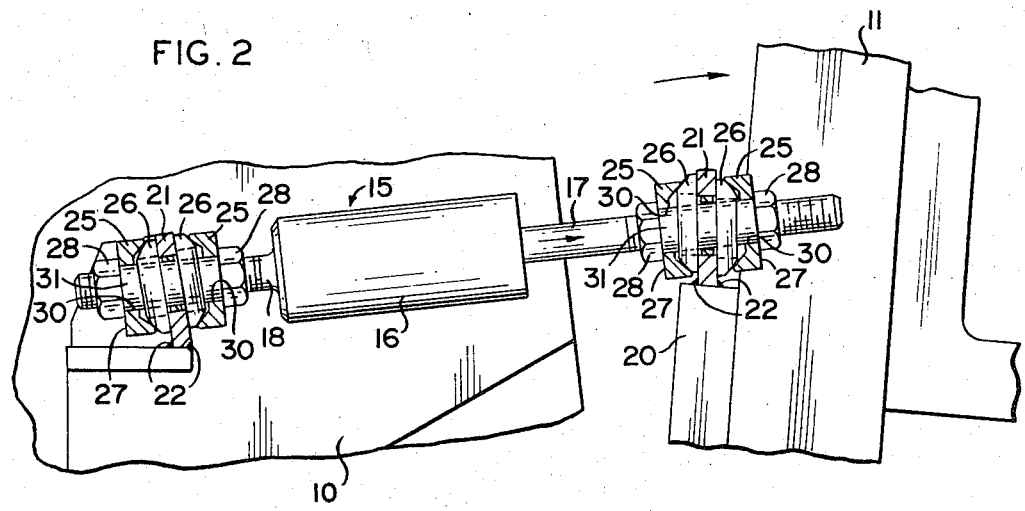
FIG. 2 is a view similar to FIG. 1 but illustrating the ram of FIG. 1 extended so as to tilt the mast of the truck forwardly.

As is common in the art, a hydraulic ram is adapted to tilt the mast 11 between a full backward position illustrated in FIG. 1 and a full forward position illustrated in FIG. 2. The ram utilized in connection with this invention is designated generally by reference numeral 15 and comprises a cylinder 16 and a piston (not shown) within the cylinder 16 that extends outwardly of the cylinder in the form of a piston rod 17 that is preferably threaded for that portion of its length lying outside the cylinder when the piston is in a retracted position. The base of cylinder 16 is formed with a threaded shaft 18 that is preferably exactly the same in every regard as is that portion of the piston rod 17 lying outwardly of the cylinder 16 when the piston is retracted. The piston rod 17 and shaft 18 are made similar in order that the mechanism constituting this invention may be mounted on each. Thus, means forming the equivalent of part of a universal ball joint are mounted on the shaft 18 as well as on the piston rod 17.

In describing the invention, reference will be made only to the joint utilized for connecting the piston rod 17 with the mast 11 in order to tilt that mast, as the assembly on the shaft 18 is exactly the same in every particular, and need not be described separately.

Figure 3:
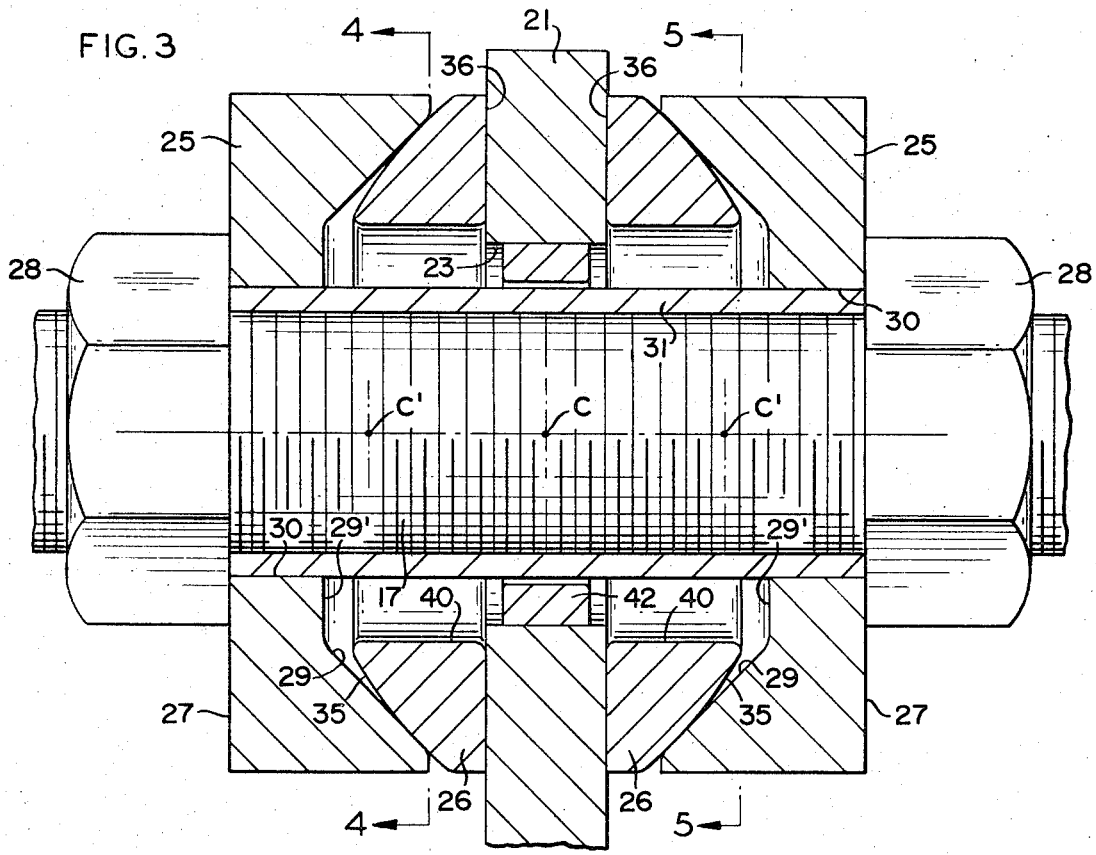
FIG. 3 is an enlarged longitudinal section view through the joint connection of this invention showing the parts thereof when no pivotal motion has taken place between the parts.
Figure 4:
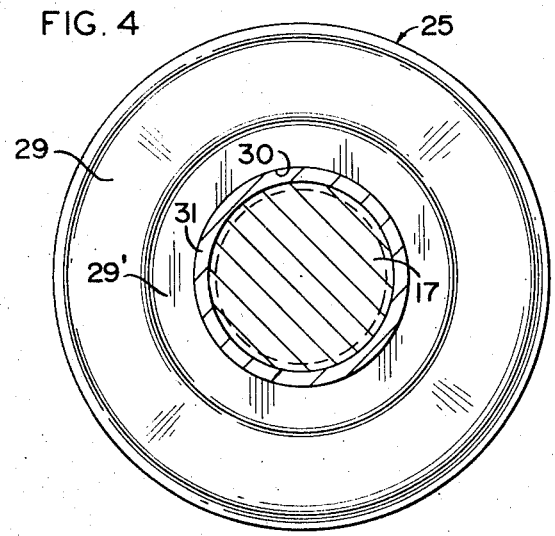
FIG. 4 is a section along line 4—4 of FIG. 3.
Figure 5:
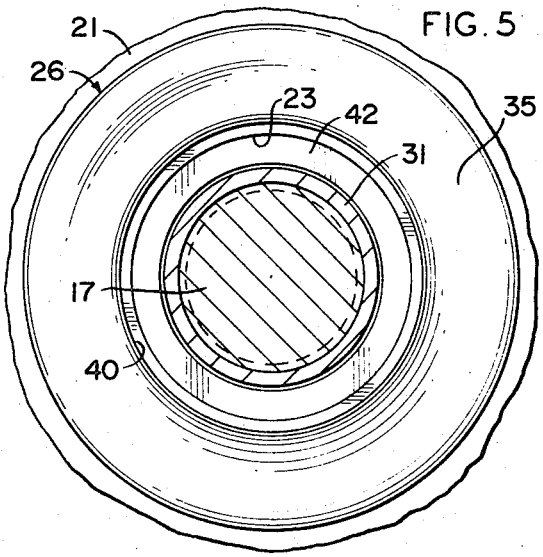
FIG. 5 is a section along line 5—5 of FIG. 3.

Referring now more particularly to FIG. 1, it will be noted that the mast 17 is formed with an extension 20, and that to this extension 20 a plate 21 is welded at 22 to form an integral part of the mast. It is through the plate 21 that thrust is imparted in either of opposite directions to the mast 11. For this purpose the plate 21 has an opening 23 as best seen in FIG. 3, through which threaded rod 17 extends. A similar plate is naturally welded to main frame 10.

The particular means through which thrust is imparted by rod 17 in either of opposed directions to the plate 21 comprises a pair of members 25, each of which is termed a cone, and a pair of members 26, each of which is termed a spherical washer. These parts are best seen in FIG. 3, and each is formed with a central opening so it may be mounted about rod 17.

Each of the cones 25 has a flat end surface 27 adapted to fit against the flat end of a nut 28, and it is obvious that the two nuts 28 are secured on the threads of rod 17 and will determine the spacing between the cones 25 on rod 17, as well as the location of the parts along the length of rod 17.

Each cone 25 is formed with a tapered surface 29 that extends into a relatively flat surface 29' that in turn terminates in an opening 30. This opening is circular and is so dimensioned that the two cones 25 may fit on a sleeve 31 that fits about the threads of rod 17 and holds the two cones on rod 17. The arrangement is such, that the two cones 25 will not move endwise relatively to the sleeve 31 and the rod 17, through action of nuts 28, and will not move angularly relatively to the rod axis because of sleeve 31.

Mounted between the two cones 25 and the plate 21 are the two spherical washers 26 earlier referred to. Each washer is formed with a spherical surface 35 that lies on the circumference of a circle of relatively large radius. Thus, it is readily seen in FIG. 3 that were the spherical surfaces 35 part of the surface of a ball as is common in ball joints, the surfaces 35 would be formed on the circumference of a circle whose center would lie at C in FIG. 3. As it happens, the center points of the circles on which the spherical surfaces 35 are formed are at the two points marked C. This results in a superior bearing arrangement between the spherical surfaces 35 of the two washers 26 and the surfaces 29 of the cones 25.

The surfaces of the two washers 26 opposite the spherical surfaces 35 thereof, are designated 36 and are flat so as to be adapted for sliding movement on the flat surfaces of the plate 21 as is clearly evident. Central openings 40 are formed in the spherical washers 26 so they may be fitted about rod 17, and openings 40 are sufficiently large so as to space the washers from the sleeve 31 on rod 17 to allow considerable sliding movement of the washers on the flat surfaces of the plate 21 without contacting the sleeve 31. In order to protect the plate 21, a sleeve 42 is fitted into the central opening 23 of the plate 21. Sleeve 42 is spaced from sleeve 31 an adequate distance to provide clearance when rod 17 is tilted with respect to plate 21.

The rod 17, as seen in FIG. 2, is extended a rather considerable distance beyond the right hand nut 28. The purpose of this extension is to demonstrate the fact that the entire assembly of cones 25 and washers 26 may be held in place in various positions along the length of the shaft 17 extending outside of the cylinder 16 of the ram 15. This obviously increases the effective length of rams 15.

In order to assemble the rod 17 to the plate 21 of the mast 11, the left hand nut 28 is first rotated to a particular position on piston rod 17, and the sleeve 31 is applied. Then, the left hand cone 25 and the left spherical washer 26 are applied. The rod 17 and sleeve 31 are now inserted into opening 23 of plate 21 with the left washer 26 and the left cone 25 at the left side of the plate 21. Of course, sleeve 42 will have been fitted into plate opening 23. Now, the right hand washer 26 and the right hand cone 25, together with the right hand nut 28 are applied over the rod 17. By rotating the two nuts 28 on the threaded rod 17 into correct relationship, all of the parts are assembled relatively to the rod 17 and the plate 21 with the spherical washers in correct relationship to the flat sides of the plate 21 and the tapered surfaces 29 of the cones 25.

It is obvious that the shaft 18 may also be made in any suitable length, and that the mounting of the cylinder 16 in universal relationship to main frame 10 may readily be achieved in the same manner as piston rod 17 is secured to the plate 21.

In FIG. 1, the ram 15 is shown with the piston rod 17 in its extreme retracted position within cylinder 16 and the mast tilted rearwardly. It will be noted by comparison to FIG. 3 that very little motion of the several parts mounted on the shaft 18 has taken place from the neutral position of FIG. 3. However, rather considerable motion of the parts on rod 17 has taken place. Thus, there has been considerable sliding movement of the two spherical washers 26 on rod 17 relatively to the plate 21. It will be noted also that there has been no pivotal motion whatsoever of the cones 25 relatively to the piston rod 17, but that there has been considerable pivotal movement of the cones 25 and the rod 17 together, relatively to the two spherical washers 26.

In FIG. 2, the mast is shown in its full forward tilted position and there again, it is obvious that while no movement of the cones 25 takes place relatively to the rod 17, there is considerable movement of the rod and the cones relatively to the two spherical washers 26 as well as sliding of washers 26 relatively to the plate 21. Thus, it may be said that the thrust imparting members are the two cones 25, which through the spherical washers 26 impart movement to the plate 21. This thrust is accompanied by pivotal movement of the spherical washers 26 on their spherical surfaces 35 relatively to cones 25 and sliding movement of the spherical washers 26 on their flat surfaces 36 relatively to the plate 21. Further, the position of the thrust imparting members along the length of the thrust rod may readily be adjusted. It is obvious that the very simple assembly illustrated has great utility in the art, and answers a long felt need for a very effective and inexpensive readily variable joint connection. It is also quite evident, that thrust is imparted by the spherical washers through surfaces of rather considerable radius made possible through curvature of the spherical washers that cannot be obtained in a conventional ball of the prior art.

While the invention has been described with respect to certain specific assemblies, it will be appreciated that it may be used in other assemblies in modified form by those skilled in the art without departing from the spirit of the invention. It is intended, therefore, by the appended claims to cover all such modifications as fall within the true spirit and scope of the invention.

We now claim:

1. In a truck having a tilting mast, a ram operatively connecting a frame member of said truck with said tilting mast to effect tilting movement of said mast, a first thrust receiving member fixed to said frame member connecting one end of said ram to said frame member, and a second thrust receiving member fixed to said mast and connecting the other end of said ram to said mast; the improvement comprising a thrust imparting joint connecting at least one end of said ram to its thrust receiving member, said joint comprising opposed flat bearing surfaces formed on said thrust receiving member, a pair of movable members each having a truncated spherical bearing surface and an opposed flat bearing surface formed thereon, means defining an extension of said ram extending through said thrust receiving member and carrying each said movable members with said flat surface bearing on one of said opposed surfaces of said thrust receiving member, a pair of thrust imparting members carried by said ram extension each having a tapered bearing surface bearing against said truncated spherical surface of one of said movable members, and means holding said members in said bearing relationship, said movable member being in the form of a relatively thick circular washer encircling said ram extension and having a radius across the flat bearing surface which is considerably smaller than the radius of curvature of the truncated spherical bearing surface.

2. The invention as claimed in claim 1, in which said ram extension comprises a cylindrical rod section extending through an opening in each said thrust imparting members, and including bushing means interposed between said rod section and said thrust imparting members, whereby said thrust imparting members are restrained against bodily tilting movement relative to one another.

3. The invention as claimed in claim 1, in which said ram comprises a hydraulic cylinder, and said ram extension comprises a piston rod operatively connected to the operating piston of said hydraulic cylinder.

4. The invention as claimed in claim 1, in which said ram extension comprises a threaded rod section, and said means holding said members in bearing relationship comprises a pair of nuts received on said threaded rod section and tending to clamp said members against said thrust receiving member.

* * * * *